US007941805B2

(12) United States Patent
Dillenberger et al.

(10) Patent No.: US 7,941,805 B2
(45) Date of Patent: *May 10, 2011

(54) AFFINITY DISPATCHING LOAD BALANCER WITH PRECISE CPU CONSUMPTION DATA

(75) Inventors: Donna N. Dillenberger, Yorktown Heights, NY (US); Greg A. Dyck, Morgan Hill, CA (US); Stephen J. Heisig, Tarrytown, NY (US); Bernard R. Pierce, Poughkeepsie, NY (US); Donald W. Schmidt, Stone Ridge, NY (US); Gong Su, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1303 days.

This patent is subject to a terminal disclaimer.

(21) Appl. No.: 11/504,155

(22) Filed: Aug. 15, 2006

(65) Prior Publication Data

US 2008/0046895 A1    Feb. 21, 2008

(51) Int. Cl.
  *G06F 9/46*    (2006.01)
  *G06F 15/173*  (2006.01)
(52) U.S. Cl. ........ 718/105; 718/100; 718/104; 709/224; 709/225; 709/226
(58) Field of Classification Search ............... 718/104, 718/105
  See application file for complete search history.

(56) References Cited

U.S. PATENT DOCUMENTS

| | | | |
|---|---|---|---|
| 5,283,897 A * | 2/1994 | Georgiadis et al. | 718/105 |
| 5,301,324 A * | 4/1994 | Dewey et al. | 718/105 |
| 5,764,740 A | 6/1998 | Holender | |
| 6,026,425 A | 2/2000 | Suguri | |
| 6,996,822 B1 * | 2/2006 | Willen et al. | 718/102 |
| 2004/0098447 A1 * | 5/2004 | Verbeke et al. | 709/201 |
| 2005/0155032 A1 * | 7/2005 | Schantz | 718/100 |

OTHER PUBLICATIONS

Faik, Jamal, "A Model for Resource-Aware Load Balancing on Heterogeneous and Non-dedicated Clusters", Jul. 2005, Rensselaer Polytechnic Institute, pp. 1-101.*
Hamidzadeh et al., "Self-Adjusting Scheduling: An On-Line Optimization Technique for Locality Management and Load Balancing", IEEE, 1994, pp. II-39 through II-46.*

* cited by examiner

*Primary Examiner* — Kenneth Tang
(74) *Attorney, Agent, or Firm* — Michael J. Buchenhorner; Derel S. Jennings

(57) ABSTRACT

A computer-implemented method for distributing a plurality of tasks over a plurality of processing nodes in a processor network includes the following steps: calculating a task process consumption value for the tasks; calculating a measured node processor consumption value for the nodes; calculating a target node processor consumption value for the nodes, the target node processor consumption value indicating optimal node processor consumption; calculating a load index value as a difference between the calculated node processor consumption value for a node i and the target node processor consumption value for node i; and distributing the tasks among the nodes to balance a processor workload among the nodes, according to the calculated load index value, such that the calculated load index value of each node is substantially zero. The method further embodies a multi-dimensional balancing matrix, each dimension of the matrix representing a node corresponding to a different processor type and each cell representing tasks assigned to multiple nodes.

1 Claim, 4 Drawing Sheets

*4a*

*4b*

*4c*

AFFINITY DISPATCHING LOAD BALANCER WITH PRECISE CPU CONSUMPTION DATA

CROSS-REFERENCE TO RELATED APPLICATIONS

None.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of processor load balancing and more particularly relates to the field of processor affinity load balancing.

BACKGROUND OF THE INVENTION

In multiprocessor architectures, it is desirable to keep a task executing on the same processor as much as possible so as to exploit caching benefits. This is particularly important in a Non-Uniform Memory Access (NUMA) architecture, where inter-cache access latency is significantly higher than intra-cache access latency. In such NUMA architectures, substantial performance degradation occurs if a task is frequently dispatched to processors not sharing the hardware cache.

In order to keep a task executing on the same processor (or a group of processors) as much as possible, a logical concept called affinity nodes is defined. An affinity node is a group of processors sharing a hardware cache. A task is marked with a value (called its affinity) which associates it with an affinity node. A Task Dispatcher tries to honor a task's affinity by always dispatching the task to the processors belonging to the affinity node designated by the task's affinity value.

Because tasks are always dispatched to their respective affinity nodes, over time the tasks' changing characteristics and processing demands will create processor load imbalance among affinity nodes. Therefore, a processor load balancing mechanism is needed to reassign tasks' affinity in order to balance the total system processor consumption across all affinity nodes. Additionally, affinity nodes can contain different numbers of processors therefore each affinity node may have a different capacity. The term "balance," instead of the often-taken meaning of making processor consumption on all affinity nodes equal, generally means to make processor consumption on all affinity nodes satisfy certain criteria. A common criterion for a balanced system is one where the total system processor consumption is distributed across all affinity nodes in proportion to their capacity.

Existing processor load balancing schemes in production operating systems such as UNIX (and UNIX variants) have one common characteristic: they all use the average task run queue length as an estimation of the processor load. This is because task run queue length (also known as runqueue length) is easy to measure and the majority of today's production operating systems do not have a built-in facility for precise processor consumption measurement on a per task basis. While sufficient for most cases, average task run queue length does not always accurately reflect the true processor load.

Referring to FIG. 1 there is shown a simple example of a processor network 100 with two nodes which will serve to illustrate this concept. The system operates with two nodes 140 and 160, each node containing one CPU; and logical Task Managers 120 and 130. Task Manager 120 dispatches tasks 180 to node A 140 and Task Manager 130 dispatches tasks to node B 160. Because the Task Managers 120 and 130 operate independently, over time the processor load within the network 100 can become unbalanced due to the fact that the number of tasks and the CPU demand characteristics of tasks arriving on nodes 140 and 160 can be very different. Therefore, a Balancer 150 is needed to move tasks between the Task Managers 120 and 130 in order to balance the processor load on nodes 140 and 160. In known processor networks, a Balancer 150 judges the processor load on a node by using the average runqueue length of that node; the longer the queue length, the more loaded the node. However, this method has pitfalls, as we illustrate with examples below.

Assume n+1 tasks 180 enter affinity node A 140; the node uses its full processing capacity for a short period of time t; and then all tasks 180 finish. The processors in affinity node A 140 are then idle for a short period of time t before another n+1 tasks 180 enter the node A, and this cycle repeats until there are no more tasks in the queue with affinity A. For node A 140, on average the processor load is about 50% (i.e., half of the time the processor is busy and half of the time the processor is idle) and the runqueue length is about n/2 (half of the time there are n tasks waiting and half of the time there are no tasks waiting).

Now consider another affinity node, node B 160, where a single long-running processor bound task uses the full processing capacity of node B and no other tasks are waiting. For this node, on average the processor load is 100% (the processor is always busy) yet the runqueue length is zero (there are no tasks waiting). The Balancer 150, using the average runqueue length method, will move tasks from the half-loaded node A 140 to the fully-loaded node B 160, which would further unbalance the workload.

Another problem with the average task run queue length approach is that, when a task is moved to balance the processor load, no consideration is given to the actual processor consumption of the moved task, which can lead to further unbalancing of the system. Another example will illustrate this. Referring again to FIG. 1, consider that affinity node A 140 now has a long-running CPU bound task occupying the CPU in addition to the n+1 tasks 180 periodically entering the node. For this node, on average the processing load is 100% and the runqueue length is about (n+1)/2. Now consider affinity node B 160 with the same single long-running CPU bound task. For node B 160, on average the processing load is 100% and the runqueue length is 0. This system is clearly unbalanced and tasks need to be moved from node A 140 to node B 160. The Balancer 150 generally selects the task(s) to be moved by first moving the tasks 180 at the end of the task run queue because tasks at the end of the queue have the longest wait time. Using this method without taking into consideration the processor consumption of the tasks 180 to be moved can potentially unbalance the system further because the long-running CPU bound task on node A 140 can happen to be the last task on the queue and may be moved to node B 160. As a result, node A 140 will again be idle half of the time (as illustrated with the previous example when node A 140 did not have the long-running CPU bound task) while node B 160 will be overloaded with two long-running CPU bound tasks, each getting only 50% of the processor capacity.

FIG. 2 shows another representation of load balancing in a processor architecture 200 with multiple processors. The figure shows a typical NUMA processor architecture with the two affinity nodes of FIG. 1, plus two more affinity nodes, each node now with four CPUs instead of one. In practice, both the number of affinity nodes and the number of CPUs in each node can be different. The four CPUs in each node share L2 cache (Level 2 cache, or cache memory that is external to a microprocessor). L2 cache memory resides on a separate chip from the microprocessor chip, as opposed to Level 1 cache which resides on the microprocessor chip. An L2 cache is necessary in order for multiple CPUs to share cache memory. In this processor architecture 200 the Task Managers 120 and 130 of FIG. 1 are now actually four dispatchers, each dispatcher responsible for one node. Each dispatcher receives a job queue of tasks for its particular node. Dispatcher 225 dispatches the tasks from job queue A 220 to node A 140; Dispatcher 235 dispatches the tasks from job queue B 230 to node B 160; Dispatcher 245 dispatches the tasks from job queue C 240 to node C 250; and Dispatcher 255 dispatches the tasks from job queue D 250 to node D 260.

Each node is connected through the network 200 to every other node in the network for load balancing purposes. The architecture 200 as shown in FIG. 2 is quite a simple multi-processor architecture, yet it is scalable to a large degree. In fact, with today's ever-increasing processing needs, networks of thousands and even tens of thousands of processors are in use, making CPU load balancing imperative, yet current load-balancing algorithms fall short of reaching an optimal balance because average runqueue length does not always accurately reflect the true processor load.

Therefore, there is a need for a processor load-balancing method to overcome the shortcomings of the prior art.

SUMMARY OF THE INVENTION

Briefly, according to a claimed invention, a computer-implemented method for distributing a plurality of tasks over a plurality of processing nodes in a network includes the following steps: calculating a task process consumption value for the plurality of tasks; calculating a measured node processor consumption value for the plurality of nodes; calculating a target node processor consumption value for the plurality of nodes, the target node processor consumption value indicating optimal node processor consumption; calculating a load index value as a difference between the measured node processor consumption value for a node i and the target node processor consumption value for node i; distributing the tasks among the nodes to balance a processor workload among the nodes, such that the calculated load index value of each node is substantially zero.

The method further embodies a multi-dimensional balancing matrix, each dimension of the matrix representing a node corresponding to a different processor type and each cell representing tasks assigned to multiple nodes, along with the following steps: sorting the calculated load index values in order from the highest load index value to the lowest load index value; populating the matrix with tasks according to the sorted load index values; re-arranging the tasks in the cells so as to represent a balance of the processor workload among the nodes; and distributing the tasks to the processors according to the matrix representation.

The method further embodies an extension of the multi-dimensional balancing matrix, wherein each dimension can represent multiple nodes of different processor types, along with the following step: re-arranging the tasks in the cells such that processor workload can be moved freely from one type of node to another but not the opposite way, according to predetermined usage rules.

DESCRIPTION OF THE PREFERRED EMBODIMENT

Figure 1:
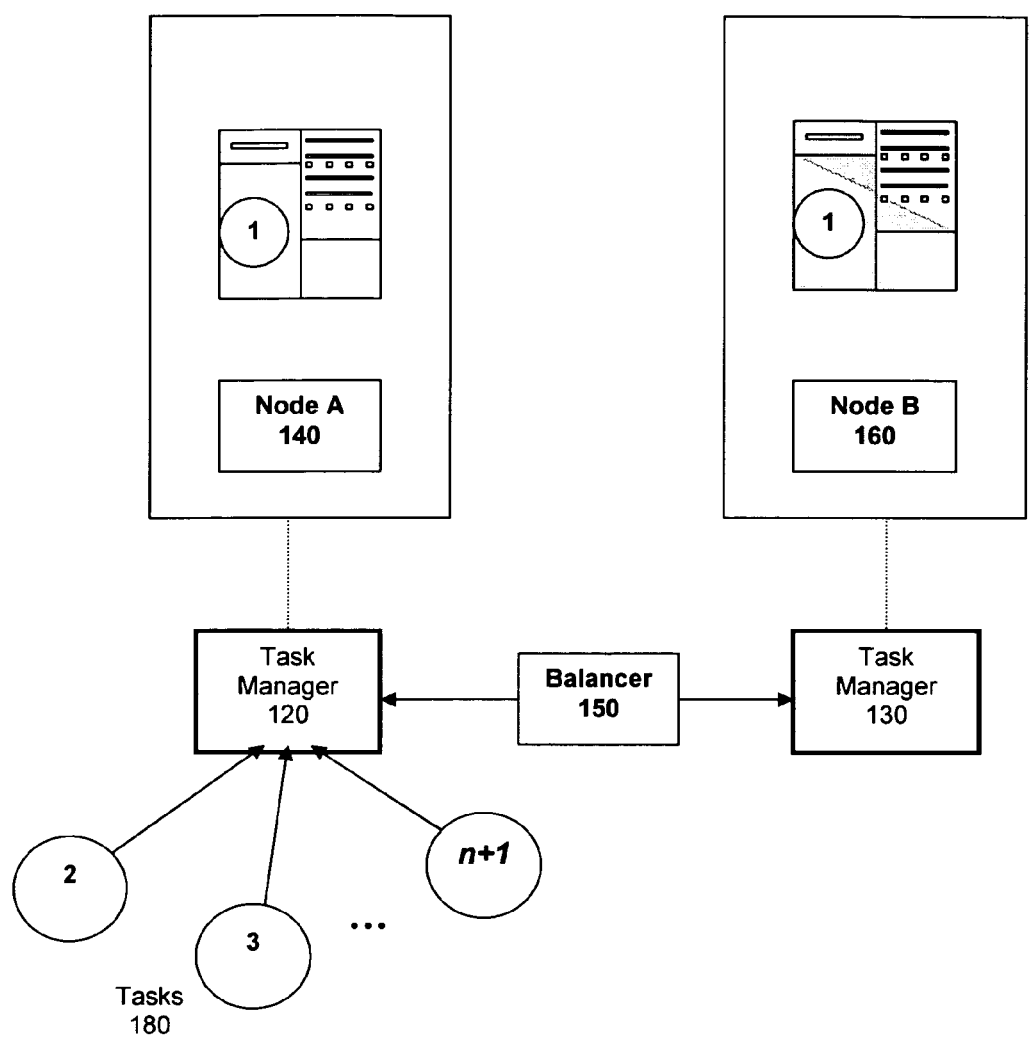
FIG. 1 is an illustration of a load-balancing system, according to the known art.
Figure 2:
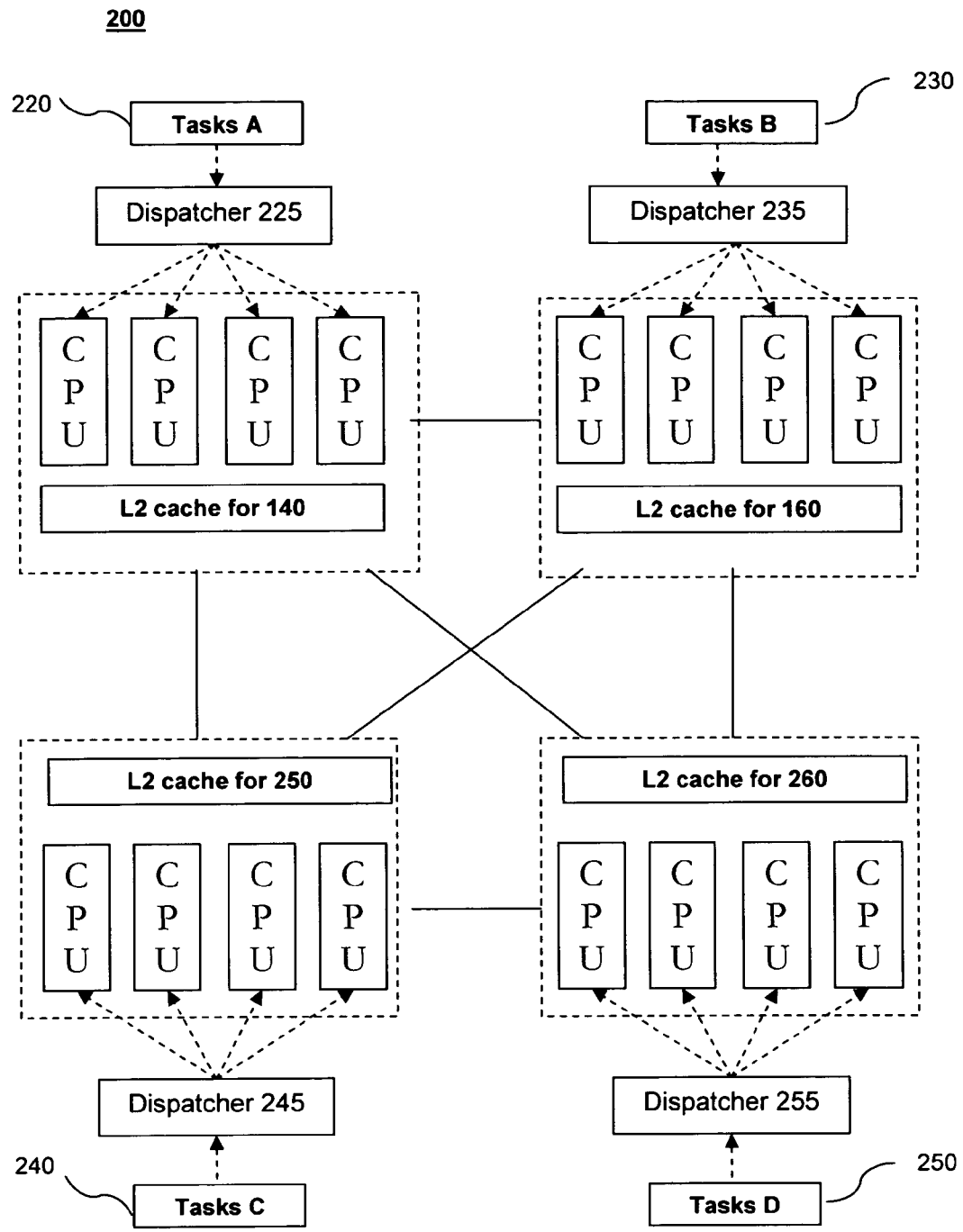
FIG. 2 is an illustration of another load-balancing system, according to the known art.

A method, according to an embodiment of the present invention, performs load balancing of total system processor consumption across a set of processor groups called affinity nodes located within a processor network. The method employs an algorithm which uses precisely measured affinity node CPU consumption and per task CPU consumption data. This algorithm is an improvement over known load balancing algorithms using average task run queue length (also known as average runqueue length) because it uses actual per task and per node CPU consumption data to avoid the pitfalls associated with average runqueue length.

The Greedy Load Balancing Algorithm.

To achieve the load-balancing goal, the algorithm according to an embodiment of the invention uses a "greedy" approach which repeatedly moves tasks from the most loaded (busiest) affinity node to the least loaded (most idle) affinity node until no task can be moved to bring the system closer to the goal. Greedy algorithms exist in science and mathematics and are often used when a step-by-step problem-solving approach is needed. A greedy algorithm is aptly named because it makes a decision on whether to move a task or not based on what appears to be the best move at the moment, which may or may not be the best decision ultimately when all possible moves are considered simultaneously. In spite of this flaw, greedy algorithms are often used because it is computationally infeasible to enumerate all possible moves simultaneously and try to find the absolutely best set of moves to achieve the balancing goal. The greedy algorithm as applied to processor load-balancing (greedy affinity load-balancing algorithm) takes the following inputs: 1) a list of affinity nodes, their capacity, and their measured node processor consumption; and 2) a list of tasks, their affinities, and their measured per-task processor consumption. This algorithm differs from the algorithm discussed with respect to FIG. 1 in that it takes into account, instead of average runqueue length, the actual CPU consumption for each node and for each task. The output of the greedy affinity algorithm is a reassignment of the tasks' affinity values such that the total system processor consumption is distributed across all of the affinity nodes in proportion to their capacity.

The greedy affinity load-balancing algorithm has the following features:

a) efficiency: the computation needed for balancing is very simple and each task is moved at most once;

b) thrashing avoidance: CPU thrashing is avoided in situations where a task is constantly being moved from one affinity node to another in successive balancing runs;

c) heterogeneity: affinity nodes can be of different types (i.e., having different types of CPUs), and each task can have CPU consumption on more than one type of affinity node;

d) asymmetric balancing: balancing between different types of affinity nodes may be asymmetric, i.e., a load can be moved freely from one type of affinity node to another but not the opposite; and e) feedback: provides feedback to a CPU consumption monitoring mechanism to coordinate load balancing and consumption measuring effort In order to quantify how close a system is to its load balancing goal, some simple calculations are made and the results of these calculations are reported to a Load Balancer 150 or whatever mechanism coordinates the load balancing among processors in a distributed processor network. The first calculation is to compute, for each affinity node i, a load index ($l_i$). The $l_i$ is the difference between the measured affinity node CPU consumption ($c_i$) for node i and the target affinity node CPU consumption ($t_i$) for node i. This computation can be expressed as:

$$l_i = c_i - t_i$$

Where $t_i$ is what an affinity node would consume if total system CPU consumption were distributed across all of the affinity nodes in proportion to their capacity. The $t_i$ for a given node i is computed as follows:
1) find the sum of the measured affinity node CPU consumption $c_i$ for all nodes and the sum of the affinity node capacity $p_i$ for all nodes;
2) divide the sum of the $c_i$ by the sum of the $p_i$;
3) multiply that quotient by the affinity node capacity $p_i$ for a given node i.

This is expressed mathematically as:

$$t_i = p_i * \Sigma c_i / \Sigma p_i$$

where $p_i$ is the affinity node capacity. Note that if all affinity nodes had the same capacity, target affinity node CPU consumption would simply be the total system CPU consumption averaged over all of the affinity nodes. The $l_i$ measures how "loaded" an affinity node is. The higher the $l_i$, the more loaded the affinity node. Note that $l_i$ can be negative, which means an affinity node is being underutilized. The goal of the greedy affinity load balancing algorithm is therefore to bring the $l_i$ of all affinity nodes as close to zero as possible. Zero represents a perfect balance. To measure the "spread" of affinity node CPU consumption, i.e., the distance of the overall system to its goal state where the $l_i$ of all affinity nodes is zero, we compute a load index deviation d as follows:

$$d = \oplus \overline{\Sigma (c_i - t_i)^2 / n} = \oplus \overline{\Sigma l_i^2 / n}$$

where n is the number of affinity nodes. Note that when all affinity nodes have the same capacity, d is the familiar standard deviation. A further object of the greedy affinity balancing algorithm is to reduce d so that it is as close to zero as possible. In order to see how d changes when a task is moved from one affinity node to another, we compute the following:

$$d_2 - d_1 = (d_2^2 - d_1^2)/(d_2 + d_1) = (v_2 - v_1)/(d_2 + d_1)$$

where $v = d^2$ is the load index variance, and the subscripts 1 and 2 denote values before and after the task is moved, respectively. Since $d_1 > 0$ and $d_2 > 0$, it follows that if $v_2 - v_1 < 0$ then $d_2 - d_1 < 0$. That is, if moving a task reduces the load index variance, it also reduces the load index deviation. Furthermore, when a task with CPU consumption w is moved from affinity node i to j:

$$v_1 = (\ldots + l_i^2 + \ldots + l_j^2 + \ldots)/n$$

$$v_2 = (\ldots + (l_i - w)^2 + \ldots + (l_j + w)^2 + \ldots)/n$$

With simple math, we can derive:

$$v_2 - v_1 = 2 * w * (w + l_j - l_i)/n$$

Since $w > 0$ and $n > 0$, it follows that if $w + l_j - l_i < 0$ then $v_2 - v_1 < 0$, which in turn means $d_2 - d_1 < 0$. Therefore, to determine whether moving a task from affinity node i to j brings the system closer to its balancing goal, we simply need to check the inequality: $w + l_j - l_i < 0$ When the inequality holds, the move will bring the system closer to its balancing goal; otherwise, it will not.

Referring to the flowchart of FIG. 3 the logic for the greedy affinity balancing algorithm proceeds as follows. In step 310 the Balancer 150 prepares a list N of all affinity nodes in the system. In Step 320 a decision must be made to determine if there is more than one affinity node. If there is only one affinity node, then there is no need for load balancing among nodes. If, however, the system contains more than one affinity node, the processing moves on to step 330 to find the $l_i$ for each node i. Once the $l_i$ for each node is calculated, the node S with the highest load index value $l_S$ must be identified. Additionally, the node T with the lowest load index value $l_T$ must also be identified. After that a list M of all tasks with affinity S is prepared.

Moving on to step 340 the list M is queried. If M is equal to zero (i.e., no tasks with affinity S), the node S is removed from the list N of all nodes in step 390 and processing is returned to step 320. Otherwise, from the list M of all tasks with affinity S, find the largest CPU consuming task W (whose CPU consumption is w) and then remove it from M (so that it is only moved once). In the next step 360, compute the value $w + l_T - l_S$. If this value is less than zero, then moving the task from S to T will improve the balance of the system. Therefore processing continues at step 370 to re-assign W's affinity (from S) to T. Otherwise, moving the task from S to T will not improve and may even worsen the balance of the system. Therefore, we ignore this task and go back to step 340 to choose the next largest CPU consuming task from list M.

Next in step 380 query M again to determine if it has been reduced to zero (no more tasks with affinity S). If so, in step 390 remove S from the list N of affinity nodes and proceed to step 320 to determine if there are any nodes left to process. Otherwise, if M is greater than zero (i.e. there is at least one task left with affinity S), return to step 320 without removing S from the list N. The process will continue in this manner until the list of affinity nodes is reduced to one.

Figure 3:
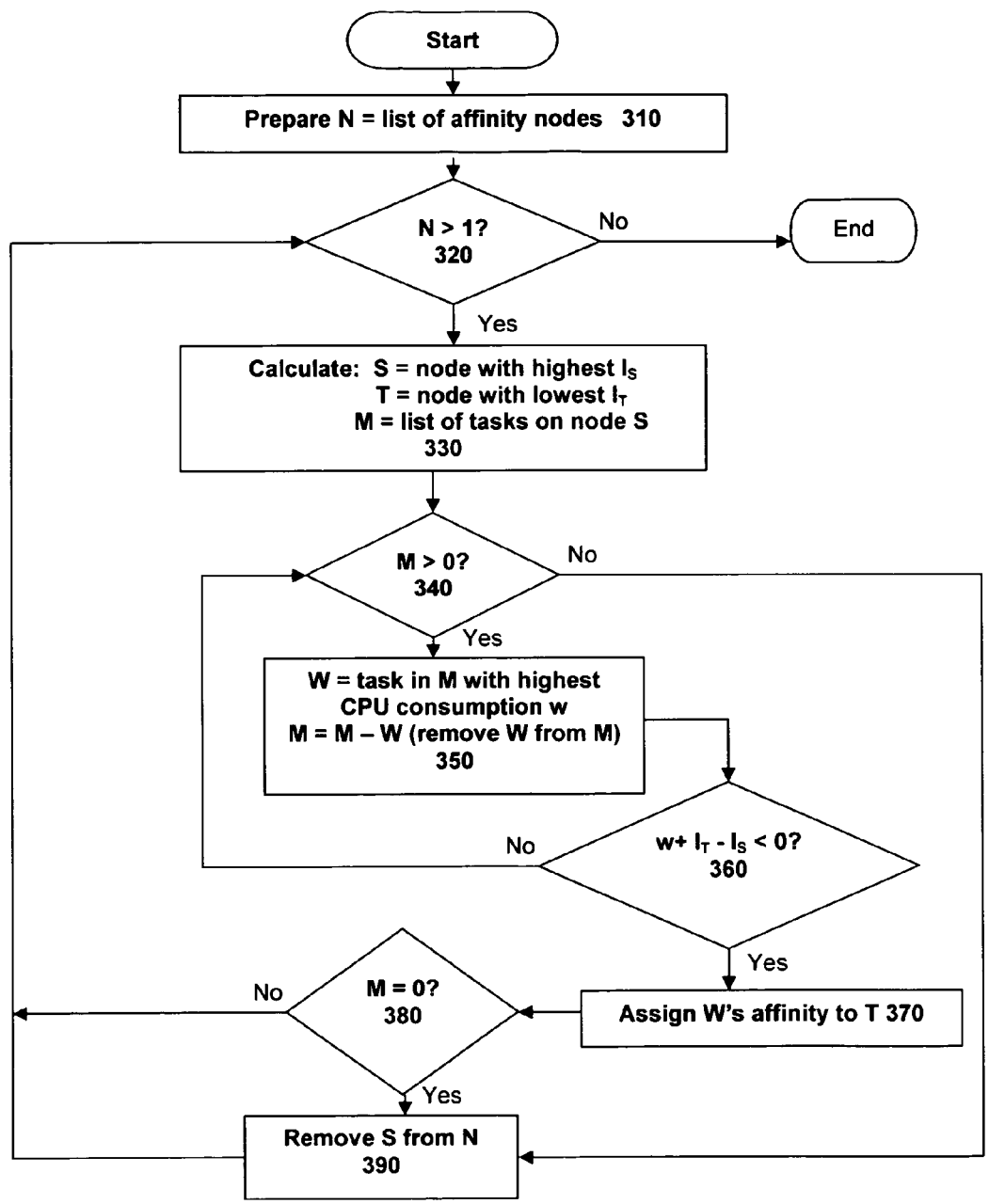
FIG. 3 is a flow chart illustrating a method for greedy affinity load balancing, according to an embodiment of the invention.

The pseudo-code for the processing of FIG. 3 is as follows:

```
Let N = the list of affinity nodes;
While (N has more than one affinity node)
{
    Find the affinity node S with the highest load index value l_S;
    Find the affinity node T with the lowest load index value l_T;
    Let M = the list of tasks with affinity S;
    While (M is not empty)
    {
        Find the largest CPU consuming task W in M;
        Remove W from M;
        if (w + l_T - l_S < 0)
        {
            Reassign W's affinity to be T;
            break;
        }
    }
    if (M is empty) Remove S from N;
}
```

In essence, the algorithm depicted in the flowchart of FIG. 3 repeatedly moves the largest CPU consuming task W only if the movement results in a reduction of the load index deviation, from the most loaded affinity node S to the least loaded one T. The condition to determine whether the movement will result in a reduction of the load index deviation, $w+l_T-l_S<0$, is very simple and can be computed very quickly. In addition, each task is moved only once to reduce the computational overhead incurred by the Balancer 150 itself. Note that each time a task is moved, the most loaded affinity node S and the least loaded affinity node T may change; therefore the algorithm must constantly update its parameters. When all the tasks on an affinity node have been considered, the affinity node is removed from the list of affinity nodes N participating in load balancing. The algorithm ends when there is only one affinity node left in the list N. It should be understood that the Balancer 150, as shown in FIG. 1, is merely a representation of the logic for performing the above steps. Those skilled in the art will appreciate that other representations are possible within the spirit and scope of the invention.

Figure 4A:
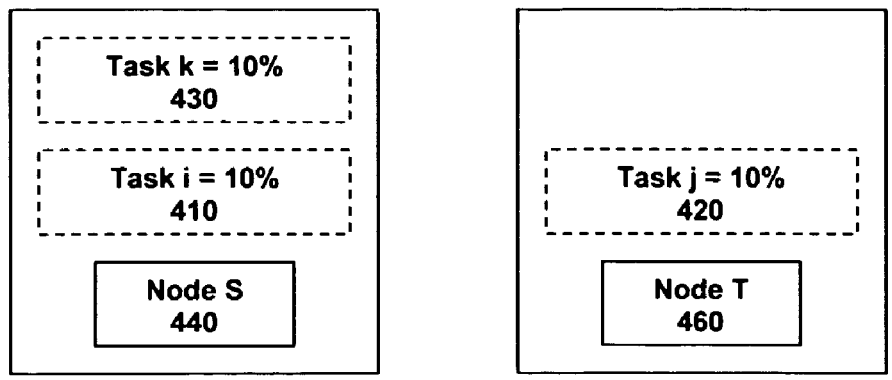
FIGS. 4a, 4b, 4c are illustrations of task assignment in a load-balancing system, according to an embodiment of the present invention.
Figure 4B:
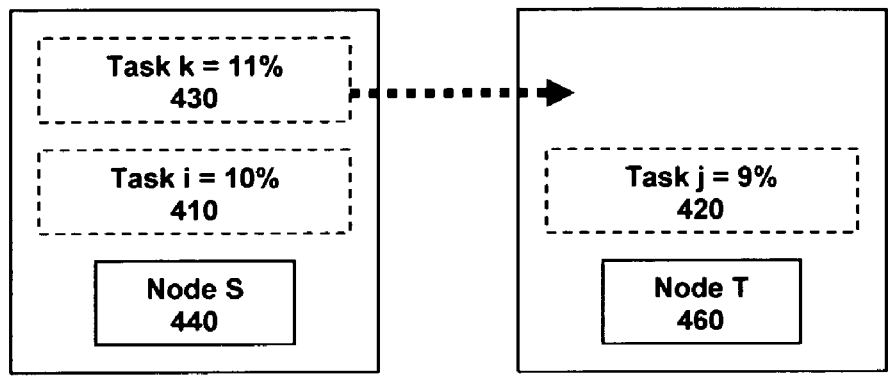
Figure 4C:
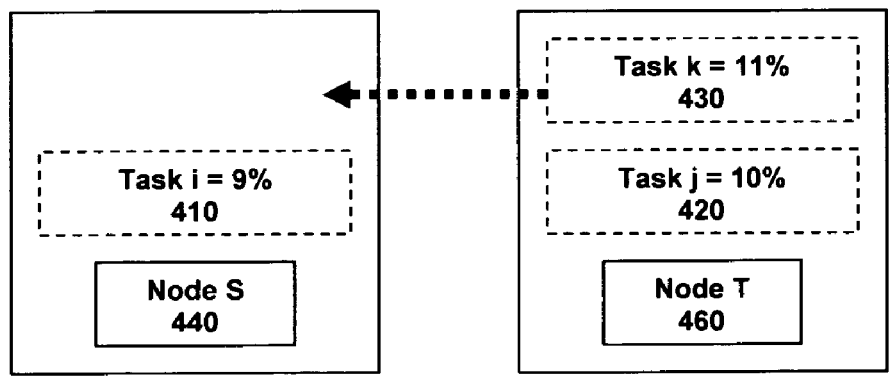

An important feature of load balancing algorithms is to avoid CPU thrashing. CPU thrashing occurs when a task is repeatedly moved from one affinity node to another in successive balancing runs. With runqueue length based balancing algorithms, CPU thrashing can happen when the algorithms attempt to tightly balance the runqueue length (i.e., to make all the individual runqueue lengths equal). One way to avoid CPU thrashing is to allow an error tolerance of individual runqueue lengths from the averaged system runqueue length. In the greedy affinity load balancing algorithm, CPU thrashing can also occur, as shown in the examples of FIGS. 4a, 4b, and 4c:

Assume there are 2 affinity nodes S 440 and T 460 (for simplicity, each node has equal capacity), and 3 tasks i 410, j 420, and k 430, each consuming about the same amount of CPU processing, say 10%. After assigning 2 of the tasks, e.g., i to S and j to T, the 3rd task k can be assigned to either S or T. Assume k is assigned to S as in FIG. 4a. Now assume that the next time the balancing algorithm runs, j's CPU consumption changed slightly, from 10% to 9%, and k's CPU consumption also changed slightly, from 10% to 11%. Now we have on node S: tasks k=11% and i=10%, and on node T: task j=9% as shown in FIG. 4b. The average CPU consumption of nodes S and T is ((11%+10%)+9%)/2=15%. Node S's load index is (11%+10%)−15%=6% and node T's load index is 9%−15%=−6%.

If the Balancer 150 were to move task k from node S to node T, it follows that 11%−6%−6%=−1%<0. Therefore the movement reduces load index deviation and is allowed (represented by the dotted arrow in FIG. 4b). So now we have on node S: task i=10%, and on node T: tasks k=11% and j=9%. Assume that the next time the balancing algorithm runs, i's CPU consumption changed slightly, from 10% to 9%, and j's CPU consumption also changed slightly, from 9% to 10%. It's easy to see that the situation now is exactly the opposite to that of the last time the balancing algorithm ran (as depicted in FIG. 4b). Now task k is moved back from node T to S (represented by the dotted arrow in FIG. 4c). This "ping-pong" effect (CPU thrashing) can occur with every known load-balancing scenario and it can continue to occur indefinitely.

It's clear that the reason for CPU thrashing in the greedy affinity load balancing algorithm is because the condition for allowing a task to be moved, $w+l_T-l_S<0$, is too sensitive to the small fluctuations in task CPU consumption, i.e., a task reassignment can occur whenever there is any amount of reduction in load index deviation, however small the reduction is.

To avoid CPU thrashing, the condition for allowing a task to be moved needs to be modified. The greedy affinity load balancing algorithm modifies the condition for allowing a task to be moved by adding a threshold figure to the calculation. The new threshold condition is:

$$w+l_T-l_S<-T(T>0)$$

In other words, we allow a task to be moved only if the movement reduces the load index deviation by more than a certain amount T (the threshold amount). The T can be a parameter of the balancing algorithm and can be tuned depending on workload characteristics. With the modified condition, the greedy affinity load balancing algorithm will move a task only if the fluctuation in task CPU consumption is large enough to cause a significant amount of load imbalance among affinity nodes so that a movement will reduce a substantial amount of load index deviation.

In addition to standard general purpose CPUs, a system may have special purpose CPUs, which are CPUs dedicated to certain types of processing. For example, IBM's zSeries Application Assist Processor (ZAAP) runs only Java applications. The benefit of special purpose CPUs like ZAAP is that their cost of computing is much lower than general purpose CPUs. For example, customers with a large Java workload, such as IBM's WebSphere, can save a substantial amount of cost by running their Java application on zAAPs. Special purpose CPUs bring new challenges to the load balancing algorithm because there are now different types of affinity nodes, i.e., affinity nodes that contain different types of CPUs, and either each type of affinity node must be balanced independently or multiple types of affinity nodes must be balanced collectively. Tasks can now have multiple affinities, i.e., they can execute on different types of affinity nodes and consume different types of CPU resources. Moving one task can change the load on multiple affinity nodes.

In one embodiment, the greedy affinity load balancing algorithm is augmented to support different types of affinity nodes. The basic idea is to use a balancing matrix to represent different types of affinity nodes and tasks with multiple affinities. The balancing matrix can be of any dimension, each dimension representing one type of affinity node. Each cell in the balancing matrix represents the tasks having the affinities of the corresponding dimensions of the cell. For simplicity and without loss of generality, we use an example with a two dimensional balancing matrix (i.e., 2 different types of affinity nodes) to illustrate the idea.

TABLE 1

Two Dimensional Balancing Matrix.

|    | Z1 | Z2 | Z3 | Z4 |
|----|----|----|----|----|
| S1 |    | 9  |    | 11 |
| S2 | 8  |    | 5  |    |
| S3 | 7  | 14 |    | 10 |

The balancing matrix of Table 1 shows two different types of affinity nodes, standard CPU type (S) nodes and zAAP CPU type (Z) nodes. There are 3 standard affinity nodes S1, S2, and S3 and 4 zAAP affinity nodes Z1, Z2, Z3, and Z4. The number in each cell, for example 9 in cell [S1, Z2] means that there are 9 tasks which have consumed CPU resources on both affinity nodes S1 and Z2 and therefore have affinities [S1, Z2]. Cells without a number mean no task has consumed CPU resources on both affinity nodes representing that cell. For example, there are no tasks that have consumed CPU resources on both affinity nodes S1 and Z1. To adapt the greedy affinity balancing algorithm to the balancing matrix, the following procedure should be performed:

Sort the balancing matrix rows and columns from the highest load index value to the lowest load index value. For example, assume the above balancing matrix is already sorted; therefore we know that S1 is the standard affinity node with the highest load index and S3 is the node with the lowest load index. Similarly, Z1 is the ZAAP affinity node with the highest load index value and Z4 is the one with the lowest load index value.

In order to balance both types of affinity nodes, first one type is balanced, and then the other type. For example, when balancing standard affinity nodes, we find the largest standard CPU consuming task on the most loaded S1, which can be either one of the 9 tasks that have affinities [S1, Z2], or one of the 11 tasks that have affinities [S1, Z4]. If an assumption is made that it's the former, perhaps this task can be moved to S3, i.e., be reassigned as [S3, Z2]. However, before doing that, since this task also requires zAAP consumption, the algorithm must determine if the task can be reassigned to [S3, Z4] instead. This is a better reassignment because this will simultaneously balance the load from S1 to S3 and from Z2 to Z4. After balancing the standard nodes, the same procedure is performed to balance the zAAP affinity nodes. For example, assume the largest zAAP CPU consuming task is in one of the 8 tasks that have affinities [S2, Z1] on the most loaded Z1. The algorithm determines if it can be moved from [S2, Z1] to [S3, Z4]. If not, then the task is moved from [S2, Z1] to [S2, Z4]. See Table 2 which shows an intermediate step in the balancing matrix after two tasks have been moved.

TABLE 2

Two Dimensional Balancing Matrix after two tasks are moved.

|    | Z1 | Z2 | Z3 | Z4 |
|----|----|----|----|----|
| S1 |    | 8  |    | 11 |
| S2 | 7  |    | 5  | 1  |
| S3 | 7  | 14 |    | 12 |

When no more tasks are left on an affinity node, the balancing matrix row or column representing that affinity node is removed from the matrix. For example, if no more tasks with affinities [S1, *] are left, the S1 row in the balancing matrix is removed and the balancing matrix is reduced down to 2 rows by 4 columns. Similarly, if no more tasks with affinities [*, Z1] are left, the Z1 column in the balancing matrix is removed and the balancing matrix is reduced down to 2 rows by 3 columns. The algorithm ends when the balancing matrix is reduced down to 1 cell.

As has been shown, balancing between different types of affinity nodes can be done, but there are circumstances where the balancing may be asymmetric, i.e., a workload can be moved freely from one type of affinity node Z to another node S but not the other way around. This is because standard processor S can run any type of code while processor Z is a specialized processor and can only run certain types of code such as Java. Therefore, a workload on a special processor can be moved to a standard processor but it does not always follow that a workload on a standard processor can be moved to a special processor.

In one embodiment, the greedy affinity load balancing algorithm is further augmented to support such asymmetric balancing. This is done by extending the balancing matrix such that each of its dimensions can represent more than one type of affinity node. An example of the new balancing matrix is shown in Table 3.

TABLE 3

Two Dimensional Balancing Matrix with Asymmetric Balancing Support

|    | Z1 | Z2 | Z3 | Z4 | S1 | S2 | S3 |
|----|----|----|----|----|----|----|----|
| S1 |    | 9  |    | 11 |    |    |    |
| S2 | 8  |    | 5  | 1  |    |    |    |
| S3 | 7  | 14 |    | 10 |    |    |    |

In the new balancing matrix above, we see that the columns representing the ZAAP affinity nodes Z1-Z4 have been extended with additional columns representing the standard affinity nodes S1-S3. This means that when we balance the zAAP affinity nodes, we treat the standard affinity nodes as if they were ZAAP affinity nodes. This way, we can move load from the ZAAP affinity nodes to the standard affinity nodes. For example, if we find the largest ZAAP CPU consuming task in one of the 8 tasks that have affinities [S2, Z1], in addition to the possible movements seen earlier, we now have two additional possible movements: from [S2, Z1] to [S2, S2] (dashed line), which effectively moves the zAAP CPU consumption of the task from Z1 to S2; or if that's not possible (i.e., not enough room on S2) then we can try from [S2, Z1] to [S3, S3] (dotted line), which effectively moves both standard CPU and zAAP CPU consumption of the task to the standard affinity node S3. Note that we choose S3 as the target for receiving the zAAP CPU consumption since it's the least loaded standard affinity node. When we balance the standard affinity nodes, we still use only the original non-extended balancing matrix rows S1-S3 from Table 1 since standard CPU consumption cannot be moved freely to zAAP affinity nodes.

The effectiveness of load balancing algorithms using precisely measured CPU consumption data as in the above examples obviously depends upon the quality of the CPU consumption data. One aspect of the quality of the CPU consumption data with significant impact on the load balancing algorithm is the granularity of the data, which is the level of detail at which the CPU consumption data can be obtained. For example, in z/OS applications are represented by so-called address spaces, which is an area of contiguous virtual memory containing application code and data. Within an address space, there can be one or more execution units called task control blocks (TCBs). For other operating systems such as UNIX, address spaces and TCBs are at a high level similar to UNIX processes and threads, respectively. While z/OS has a built-in mechanism for measuring the CPU consumption of individual TCBs, by default it will only measure the aggregated CPU consumption of an address space due to the higher overhead of monitoring individual TCBs. The load balancing algorithm is less effective using only the more coarse aggregated CPU consumption of an address space. Therefore, the Balancer 150 and the CPU consumption measuring mechanism need to coordinate with each other to achieve the best trade-off between good load balancing and low measuring overhead.

Using the load index deviation, the greedy affinity load balancing algorithm can easily gauge "how well" the system is balanced. The Balancer 150 uses a threshold value for the load index deviation below that which it considers the system to be satisfactorily balanced. At the same time, the Balancer 150 also keeps track of several of the top CPU consuming address spaces that were not moved during the balancing run. This information will be useful for subsequent runs. Should the greedy affinity load balancing algorithm fail to bring the load index deviation below the threshold value, it will inform the measuring mechanism to start monitoring the CPU consumption of individual TCBs within the "troubled" address spaces (these will usually be the higher CPU consuming address spaces) it tracked. Therefore, the greedy affinity load balancing algorithm will only incur additional CPU consumption measuring overhead when it is necessary. When the algorithm has successfully balanced the system, it will inform the CPU consumption measuring mechanism to stop monitoring the TCBs and aggregate the TCBs back into their respective address spaces.

Therefore, while there has been described what is presently considered to be the preferred embodiment, it will be understood by those skilled in the art that other modifications can be made within the spirit of the invention.

We claim:

1. A computer-implemented method for distributing a plurality of tasks over a plurality of processing nodes in a processor network, the method comprising steps of:
    determining a processor type for each of the processing nodes if there is more than one processor type;
    wherein the processor type determines how the tasks are distributed, such that tasks specified for one type of processor are distributed to that type of processor exclusively;
    calculating a task processor consumption value for each of the plurality of tasks;
    calculating a measured node processor consumption value for the plurality of processing nodes;
    calculating a target node processor consumption value for the plurality of processing nodes, the target node processor consumption value indicating optimal node processor consumption;
    calculating a load index value as a difference between the measured node processor consumption value for a node i and the target node processor consumption value for the node i;
    calculating a load index standard deviation value as a difference of the actual processor workload distribution to a target processor workload distribution where the load index value of all affinity nodes is substantially zero, such that the load index standard deviation is reduced to substantially zero;
    creating a multi-dimensional balancing matrix, each dimension of the matrix representing a processing node corresponding to a particular processor type and each cell representing tasks;
    sorting the calculated load index values in order from a highest load index value to a lowest load index value;
    populating the balancing matrix with the plurality of tasks according to the sorted load index values;
    re-arranging the plurality of tasks in the cells so as to represent a balance of the processor workload among the processing nodes;
    removing each dimension of the matrix if its corresponding node task list is empty;
    distributing the plurality of tasks to the plurality of processors according to the matrix representation;
    extending the multi-dimensional balancing, such that each dimension can represent nodes corresponding to multiple processor types;
    re-arranging the tasks in the cells, according to predetermined usage rules, such that the re-arranging of the tasks is asymmetric;
    calculating a threshold value below which the system is considered to be satisfactorily balanced, wherein a task will be redistributed only if the redistribution reduces the load index deviation by more than the threshold value and wherein the threshold value varies according to the processor workload;
    distributing the tasks among the processing nodes to balance the processor workload among the processing nodes according to the calculated load index value of each node, such that the calculated load index value of each node is substantially zero, and such that each of the plurality of tasks is distributed only once;
    keeping track of the plurality of tasks with a processor consumption of address spaces during each balancer run, wherein a plurality of a largest processor consuming tasks are more closely monitored for better processor consumption details when the load index deviation fails to reach below the threshold value.

* * * * *